United States Patent
Wuhib et al.

(10) Patent No.: US 12,056,038 B2
(45) Date of Patent: Aug. 6, 2024

(54) LOG ANALYZER FOR FAULT DETECTION

(71) Applicant: Telefonaktiebolaget LM Ericsson (publ), Stockholm (SE)

(72) Inventors: Fetahi Wuhib, Pincourt (CA); Mbarka Soualhia, Laval (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 239 days.

(21) Appl. No.: 17/782,762

(22) PCT Filed: May 4, 2020

(86) PCT No.: PCT/IB2020/054232
§ 371 (c)(1),
(2) Date: Jun. 6, 2022

(87) PCT Pub. No.: WO2021/123924
PCT Pub. Date: Jun. 24, 2021

(65) Prior Publication Data
US 2023/0011129 A1  Jan. 12, 2023

Related U.S. Application Data

(60) Provisional application No. 62/948,601, filed on Dec. 16, 2019.

(51) Int. Cl.
*G06F 11/00* (2006.01)
*G06F 11/07* (2006.01)
*G06F 11/34* (2006.01)

(52) U.S. Cl.
CPC ...... *G06F 11/3476* (2013.01); *G06F 11/0772* (2013.01); *G06F 11/0784* (2013.01)

(58) Field of Classification Search
CPC ............. G06F 11/0703; G06F 11/0751; G06F 11/0784
See application file for complete search history.

(56) References Cited

U.S. PATENT DOCUMENTS 10,152,366 B2   12/2018  Togawa
2017/0180404 A1*  6/2017  Bersch ................ H04L 63/1433
(Continued)

FOREIGN PATENT DOCUMENTS

AU        20040603 B2    10/2000

OTHER PUBLICATIONS

International Search Report and Written Opinion dated Sep. 18, 2020 issued in PCT Application No. PCT/IB2020/054232, consisting of 18 pages.
(Continued)

*Primary Examiner* — Charles Ehne
(74) *Attorney, Agent, or Firm* — Weisberg I.P. Law, P.A.

(57) ABSTRACT

Apparatuses and methods for anomaly detection. In one embodiment, a method is implemented in a computing device for building a tree structure to represent a system behavior includes obtaining one or more training log records; and building a tree structure using the one or more training log records. The tree structure includes a plurality of tree nodes. Each successive tree node in a root-to-leaf path of the tree structure representing successive log elements of the one or more training log records. Each of the one or more training log records includes one or more log elements. In one embodiment, a method implemented in a computing device for fault detection includes obtaining a live log record and determining an anomaly in the live log record by comparing corresponding successive elements of the live log record to successive nodes in a root-to-leaf direction of the tree structure.

32 Claims, 10 Drawing Sheets

(56) References Cited

U.S. PATENT DOCUMENTS

2018/0129579 A1     5/2018    Debnath et al.
2019/0042353 A1     2/2019    Ahad
2019/0370347 A1*   12/2019    Levy ..................... G06F 18/232

OTHER PUBLICATIONS

Pinjia He et al., Drain: An Online Log Parsing Approach with Fixed Depth Tree; 2017 IEEE 24th International Conference on Web Services; consisting of 8 pages.

Mostafa Farshchi et al., Experience Report: Anomaly Detection of Cloud Application Operations Using Log and Cloud Metric Correlation Analysis; 2015 IEEE, consisting of 11 pages.

Wei Xu et al., Detecting Large-Scale System Problems by Mining Console Logs; 26th International Conference on Machine Learning, Haifa, Israel, 2010, consisting of 8 pages.

Deqing Zou et al., Improving Log-Based Fault Diagnosis by Log Classification; HAL Open Science, 11th IFIP International Conference on Network and Parallel Computing (NPC), Sep. 2014, consisting of 13 pages.

Sabah Alturfi et al., A Combination Techniques of Intrusion Prevention and Detection for Cloud Computing; Journal of Physics: Conference Series (vol. 1804, No. 1, p. 012121). IOP Publishing; Feb. 2021, consisting of pages.

A. Branitskiy et al., Hybridization of Computation Intelligence Methods for Attach Detection in Computer Networks; Journal of Computational Science 23 (2017), consisting of 12 pages.

Mohamad Jelidi et al., A Hybrid Intrusion Detection System for Cloud Computing Environments; 2019 IEEE International Conference on Computer and Information Sciences (ICCIS), consisting of 6 pages.

Deeksha Kadam et al., An Enhanced Approach for Intrusion Detection in Virtual Network of Cloud Computing; 2018 IEEE Tenth International Conference on Advanced Computing (ICoAC), consisting of 8 pages.

Karan B.V. et al., Detection of DDoS Attacks in Software Defined Networks; 2018 IEEE 3rd International Conference on Computational Systems and Information Technology for Sustainable Solutions (CSITSS), consisting of 6 pages.

Xiaolei Wang et al., Accurate Mobile Malware Detection and Classification in the Cloud; (2015) SpringerPlus, consisting of 23 pages.

Zekri et al., DDoS Attack Detection Using Machine Learning Techniques in Cloud Computing Environments; 2017 3rd IEEE International Conference of Cloud Computing Technologies and Applications (CloudTech), consisting of 168 pages.

Zhang et al., Cloudradar: A Real-Time Side-Channel Attach Detection System in Clouds; International Symposium on Research in Attachs, Intrusions, and Defenses; Sep. 2016; pp. 129-151, consisting of 23 pages.

* cited by examiner

Log Records

1st Log Record →
  1st log element — 2ND log element                                   Nth log element
  081109 203518 143 INFO dfs.DataNode$DataXceiver: Receiving block blk_-1608999687919862906 src: /
    10.250.19.102:54106 dest: /10.250.19.102:50010
  081109 203518 35 INFO dfs.FSNamesystem: BLOCK* NameSystem.allocateBlock: /mnt/hadoop/mapred/
    system/job_200811092030_0001/job.jar. blk_-1608999687919862906
  081109 203519 143 INFO dfs.DataNode$DataXceiver: Receiving block blk_-1608999687919862906 src: /
    10.250.10.6:40524 dest: /10.250.10.6:50010
  081109 203519 145 INFO dfs.DataNode$DataXceiver: Receiving block blk_-1608999687919862906 src: /
    10.250.14.224:42420 dest: /10.250.14.224:50010

LOG ANALYZER FOR FAULT DETECTION

CROSS-REFERENCE TO RELATED APPLICATIONS

This application is a Submission Under 35 U.S.C. § 371 for U.S. National Stage Patent Application of International Application No.: PCT/IB2020/054232, filed May 4, 2020 entitled "LOG ANALYZER FOR FAULT DETECTION," which claims priority to U.S. Provisional Application No. 62/948,601, filed Dec. 16, 2019, entitled "LOG ANALYZER FOR FAULT DETECTION IN CLOUD PLATFORMS," the entireties of both of which are incorporated herein by reference.

TECHNICAL FIELD

The present disclosure relates to fault detection and in particular, apparatuses and methods for analyzing logs for anomaly and/or fault detection.

INTRODUCTION

Information Technology (IT) service outages are rare events, but when they do occur, they may severely cost an organization. A recent report estimates the average cost of an IT outage to be around $5,000 per minute, with a third of organizations losing upwards of $1 million per hour. In particular, the effect of faults on cloud platforms is often highly pronounced as the outage generally affects multiple users at the same time in private cloud settings or worse, several organizations at the same time for the public cloud settings.

One type of tool for handling such costly outages is a fault detection tool that identifies when faults occur in such systems. For simple systems, fault detection may be a simple task: if a hard disk fails, for instance, all subsequent read/write attempts will fail. Therefore, in order to detect the fault of the hard disk, one just needs to attempt to read/write to/from the hard disk and check whether the attempt was successful or not. One difficulty of detecting generally occurring faults arises from the complexity of the system that can potentially fail. For instance, a small cloud platform based on OpenStack may include several 10's of servers, each of which is built from 100+ distinct hardware components where each may fail in several different ways. In addition to potential failure points that arise from hardware components, faults may also arise from errors in software components. For example, a controller server in OpenStack Cloud has 400+ processes running with a complex interdependence among them, and each of those processes potentially failing in several different ways.

There exist several faults detection approaches that are available today.

Users Feedback

A simple approach to detect faults is to wait for users to report faults they experienced after testing/using the deployed system. However, simply waiting for users' feedbacks about the detected faults is not an efficient approach to providing good performance for an IT system. Unfortunately, small organizations do use such solutions because of the costs associated with testing their IT infrastructures using automated faults detection methods. However, each fault that the system experiences can result in dozens of error reports. For instance, a sporadic link failure can generate hardware fault indications from switches at both ends of the link and both will issue a new report each time the link goes down and comes back up. Given these generated reports, this can negatively impact the complexity of fixing those faults and can impact the quality of delivered services to the users.

Test Suites

Another approach to detect faults is the use of automated test suites, less commonly known as validation suites, that are used to check whether a service/software meets its specifications (such as those included in OpenStack Tempest or Nagios check plugins). Automated test suites may include one or more detailed test cases that will be used during the testing of a system to check its availability and functionality of all of its components. However, such tests are often very expensive since they require reserving some of the system resources that are (or would have been) used by users. This may negatively affect the availability of services deployed in such IT systems. In general, the execution of test suites should be done periodically to regularly detect faults that an IT system have experienced over time. However, running those tests very often may be expensive in terms of time and may lead to system performance degradation. To avoid this high cost, the tests may be run at a lower rate but, it is less likely to detect all the faults in a timely manner. Finally, those test cases do not guarantee a full testing coverage because the tests will not include all the test cases leading to circumstances where the system would experience faults.

Metrics and Logs

Operators often attempt to understand the state of their system. For this purpose, monitoring systems may be put in place whereby either metrics that relate to the status of the system, or logs that are output by components of the system are stored in searchable databases. This information stored in a monitoring system can be used to detect faults as follows for example.

In general, it is more efficient to try and identify symptoms of faults instead of the existence of the faults themselves. Often times, detecting symptoms is much more light weight and hence can be done much more frequently than executing test suites. Several methods and techniques for detecting the existence of faults this way have been proposed and are in use today.

One very simple way to detect faults is to put a threshold on monitored values from the system. For instance, an administrator might program alarms such that when the average central processing unit (CPU) utilization of its servers grows beyond 90% during the previous 5 minutes. Alternatively, the same administrator may program alarms that notify the administrator when log entries including specific keywords (such as fatal, error, warning, etc.) are output by its system.

At least some of the existing works that address the problem of fault detection using logs or metrics are discussed below.

Some works propose using generated log files to build a template classifier for faults detection in a cloud system. However, the developers of those solutions had to classify logs manually to define a fault catalogue in the cloud environment and to build a fault keyword matrix. Although this proposal could assist system administrators to classify logs' data and map them to different fault types to better understand the real-time status of the entire system, the proposal requires a manual extraction of fault keywords. Therefore, such solution cannot be generalized to detect faults in large IT systems and does not guarantee a full coverage of the faults (e.g. severe faults affecting system performance).

Some works propose an approach to mine log files from Hadoop Distributed Files (HDFS) using source code analysis to generate composite features (e.g., state variables and object identifiers). Those features are used then to train machine learning models to identify operational issues. Although the proposed approach could detect some operational issues from the logs, it fails on several cases. This is because such approach uses a static source code analysis to extract structure from logs and hence, some part of the log message will be considered as unparsed string.

Yet another approach proposes a classification system to detect anomalies by defining several types of anomalies (e.g., a defined anomaly and an undefined anomaly). For instance, a defined anomaly can be defined using bounds on any specific metric from the monitored system. An anomaly detection and resolution component (ADRC) was proposed to identify whether a given metric value corresponds to a fault or not. However, the proposed approach requires that the user should perform metrics/features engineering to detect those features having an impact of the system faults. In addition, the proposed approach requires that one should know how to define those intervals for those metrics in order to correctly distinguish between an anomaly and a normal behavior of a system.

Another approach proposes a method to detect faults using a set of collected log files from locomotives. This is by performing a search over the logs to identify a plurality of distinct faults. In the presence of a fault in a log data from the malfunctioning equipment, the approach includes mapping the fault to the list of identified faults, and can associate the fault with a repair solution.

Yet another approach involves extracting/defining a normal pattern from collected log files by grouping the log lines according to prescribed rules and associates them with their frequencies. The generated patterns are selected based on an inclusion relation between the plurality of specified events and on the frequency of their occurrence in the logs. In the presence of a new log line, the proposed system will first map it to the list of defined groups of events. Then, the system systematically compares it to the obtained generated patterns to find a similarity. When a similarity is found, the system considers it as a normal pattern otherwise the system raises an anomaly alarm. However, the process of comparing the log to the generated normal patterns may be expensive since it should be through the whole tree of the pattern. Furthermore, the proposed approach requires a pre-knowledge about the events that can exist in log files and about grouping them into normal and abnormal groups.

Therefore, existing approaches for fault detection using logs or metrics are inefficient and lacking.

SUMMARY

Some embodiments advantageously provide methods and apparatuses for analyzing logs for anomaly and/or fault detection.

According to one aspect of the present disclosure, a method implemented in a computing device for building a tree structure to represent a system behavior includes obtaining one or more training log records; and building a tree structure using the one or more training log records. The tree structure includes a plurality of tree nodes. Each successive tree node in a root-to-leaf path of the tree structure representing successive log elements of the one or more training log records. Each of the one or more training log records includes one or more log elements.

In some embodiments of this aspect, the method further includes providing the built tree structure for detecting a system fault. In some embodiments of this aspect, the tree structure represents a behavior considered as normal of a system. In some embodiments of this aspect, building the tree structure using the one or more training log records further includes, for each of the one or more training log records, splitting the training log record into a list of successive log elements and associating the successive log elements in the list to successive tree nodes in the tree structure. In some embodiments of this aspect, building the tree structure using the one or more training log records further includes assigning a frequency value to at least certain ones of the tree nodes in the tree structure, the frequency value indicating how often the one or more training log records includes the log element associated with the tree node. In some embodiments of this aspect, the certain ones of the tree nodes include all the nodes of the tree structure.

According to another aspect of the present disclosure, a method implemented in a computing device for fault detection includes obtaining a live log record; and determining an anomaly in the live log record by comparing corresponding successive elements of the live log record to successive nodes in a root-to-leaf direction of the tree structure. The tree structure includes a plurality of tree nodes. Each successive tree node in the root-to-leaf path of the tree structure representing successive log elements of one or more training log records. Each of the one or more training log records includes at least one log element.

In some embodiments of this aspect, the method further includes comparing a first log element of the incoming live log record with a first node of the tree structure and finding a match therebetween; comparing a next second log element of the incoming live log record with one or more children nodes of the first node of tree structure; and concluding to an anomaly if none of the children nodes matches the next second log element of the incoming live log record.

In some embodiments of this aspect, determining the anomaly in the live log record by comparing the live log record to the tree structure further includes mapping the obtained live log record to a corresponding tree path of the tree structure; and determining at least one difference between tree node values of the corresponding tree path and corresponding log elements of the live log record. In some embodiments of this aspect, the tree structure represents a behavior considered as normal of a system. In some embodiments of this aspect, comparing the live log record to the tree structure further includes traversing a path along the tree structure, the path to traverse being determined by reading successive log elements in the live log record. In some embodiments of this aspect, each of the read successive log elements in the live log record determines which next tree node to traverse along the tree structure.

In some embodiments of this aspect, determining the anomaly in the live log record further includes identifying the live log record is an anomaly when one of the live log record elements either does not match any tree node in the tree structure or matches a tree node of the tree structure that has a frequency below a certain threshold, wherein said frequency represents the number of times the node value has been recorded in training records. In some embodiments of this aspect, the method further includes, if the live log record is determined to be an anomaly, initiating determining whether the anomaly is a fault. In some embodiments of this aspect, the method further includes, if the anomaly is determined not to be a fault, causing the tree structure to be updated with the live log record. In some embodiments of this aspect, initiating determining whether the anomaly is a fault further includes initiating determining whether the anomaly was previously detected; and if the anomaly was previously determined to be a fault, reporting the fault; otherwise, initiating a test to determine if the anomaly is a fault.

According to another aspect of the present disclosure, a computing device for building a tree structure to represent a system behavior is provided. The computing device includes processing circuitry. The processing circuitry is configured to cause the computing device to obtain one or more training log records; and build a tree structure using the one or more training log records, the tree structure including a plurality of tree nodes, each successive tree node in a root-to-leaf path of the tree structure representing successive log elements of the one or more training log records, and each of the one or more training log records including one or more log elements.

In some embodiments of this aspect, the processing circuitry is further configured to cause the computing device to provide the built tree structure for detecting a system fault. In some embodiments of this aspect, the tree structure represents a behavior considered as normal of a system. In some embodiments of this aspect, the processing circuitry is further configured to cause the computing device to build the tree structure using the one or more training log records by being configured to cause the computing device to, for each of the one or more training log records, split the training log record into a list of successive log elements and associating the successive log elements in the list to successive tree nodes in the tree structure.

In some embodiments of this aspect, the processing circuitry is further configured to cause the computing device to build the tree structure using the one or more training log records by being configured to cause the computing device to assign a frequency value to at least certain ones of the tree nodes in the tree structure, the frequency value indicating how often the one or more training log records includes the log element associated with the tree node. In some embodiments of this aspect, the certain ones of the tree nodes include all the nodes of the tree structure.

According to another aspect of the present disclosure, a computing device for fault detection is provided. The computing device includes processing circuitry. The processing circuitry is configured to cause the computing device to obtain a live log record; and determine an anomaly in the live log record by comparing corresponding successive elements of the live log record to successive nodes in a root-to-leaf direction of the tree structure, the tree structure including a plurality of tree nodes, each successive tree node in the root-to-leaf path of the tree structure representing successive log elements of one or more training log records, and each of the one or more training log records including at least one log element.

In some embodiments of this aspect, the processing circuitry is further configured to cause the computing device to compare a first log element of the incoming live log record with a first node of the tree structure and finding a match therebetween; compare a next second log element of the incoming live log record with one or more children nodes of the first node of tree structure; and conclude to an anomaly if none of the children nodes matches the next second log element of the incoming live log record. In some embodiments of this aspect, the processing circuitry is further configured to cause the computing device to determine the anomaly in the live log record by comparing the live log record to the tree structure by being configured to cause the computing device to map the obtained live log record to a corresponding tree path of the tree structure; and determine at least one difference between tree node values of the corresponding tree path and corresponding log elements of the live log record.

In some embodiments of this aspect, the tree structure represents a behavior considered as normal of a system. In some embodiments of this aspect, the processing circuitry is further configured to cause the computing device to compare the live log record to the tree structure by being configured to cause the computing device to traverse a path along the tree structure, the path to traverse being determined by reading successive log elements in the live log record. In some embodiments of this aspect, each of the read successive log elements in the live log record determines which next tree node to traverse along the tree structure. In some embodiments of this aspect, the processing circuitry is further configured to cause the computing device to determine the anomaly in the live log record by being configured to cause the computing device to identify the live log record as an anomaly when one of the live log record elements either does not match any tree node in the tree structure or matches a tree node of the tree structure that has a frequency below a certain threshold, wherein said frequency represents the number of times the node value has been recorded in training records.

In some embodiments of this aspect, the processing circuitry is further configured to cause the computing device to, if the live log record is determined to be an anomaly, initiate determining whether the anomaly is a fault. In some embodiments of this aspect, the processing circuitry is further configured to cause the computing device to, if the anomaly is determined not to be a fault, cause the tree structure to be updated with the live log record. In some embodiments of this aspect, the processing circuitry is further configured to cause the computing device to initiate determining whether the anomaly is a fault by being configured to cause the computing device to initiate determining whether the anomaly was previously detected; and if the anomaly was previously determined to be a fault, reporting the fault; otherwise, initiating a test to determine if the anomaly is a fault.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is an example of log records that may be used according to build a tree structure and/or detect an anomaly according some embodiments of the present disclosure;

DETAILED DESCRIPTION

Figure 1:
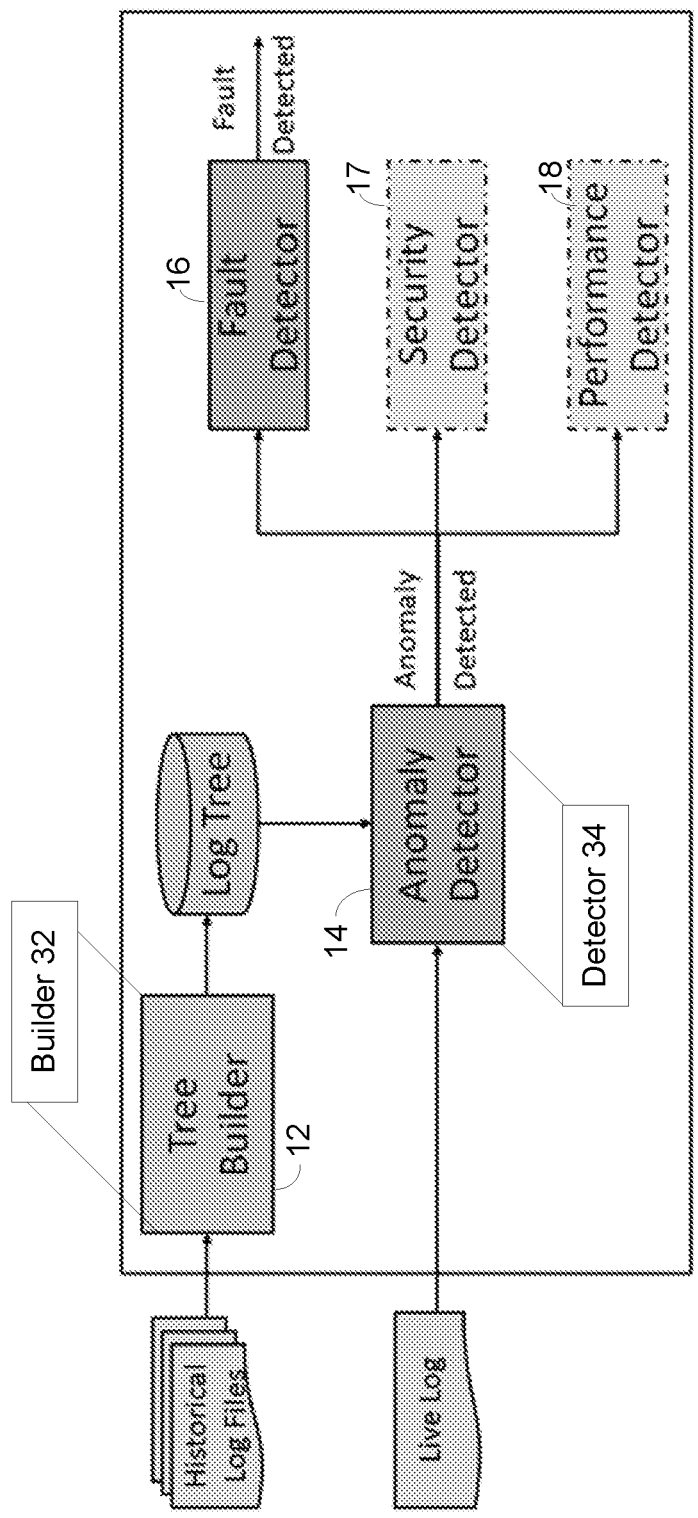
FIG. 1 illustrates an example system architecture according to some embodiments of the present disclosure.

As discussed above, the simplest approach to detect faults is the first solution that only relies on the users' feedback. However, this approach does not allow for better system performance and may lead to severe performance degradation. Therefore, relying on automated solutions like test suites and metrics/logs analysis may allow for a better fault management system, as compared to relying on users' feedback; however, those two methods require a lot of manual configuration and prior knowledge about the metrics that have a direct impact on the system faults. For instance, classifying logs data and clustering them into different fault types requires a manual extraction of fault keywords. In addition, it is often very time-consuming when executing test suites or performing metrics engineering to identify the most useful tests or features. In other words, these existing approaches require prior knowledge or determination of the most significant test cases that should be executed for system testing and how to define the metrics intervals and map them to the faults. Furthermore, an information technology (IT) architect should have an idea about the most common faults that a system may experience. However, there are faults that cannot be detected because they occur in situations where the IT administrators may not have full control about the cloud system. Considering the above facts, fault detection poses a critical and open challenge for cloud architects to design efficient detection mechanisms to deal with costly service outages in any cloud/software platform/system. Hence, designing a fast and efficient fault detection functionality is beneficial for any management system.

Some embodiments of the present disclosure propose a solution that can automatically analyze log files generated by cloud systems to detect anomalies and faults early. Some embodiments of the present disclosure may be complimentary to solutions that are based on metrics. Some embodiments of the present disclosure include three main components. The first component is referred to herein as a "tree builder" and may use historical log output or training logs from the system (in one embodiment, the historical log output/files may be the training log records/files) to build a tree-based structure that captures characteristics of that system. The second component, which is referred to herein as an "anomaly detector", uses the tree structure output from the "tree builder" component and applies the tree structure to the real-time stream of log entries that are output by the system. Using the tree-based structure, this anomaly detector component may identify anomalous log entries that may indicate the existence of a fault or anomaly in the system. In some embodiments, there may be a third component, which when it receives anomalous log entries, may attempt to verify whether the anomalous log entry indicates a true fault or not. When there indeed is a fault, a fault alarm is raised. Otherwise, the tree structure may be updated to ensure that similar log entries are not flagged as anomalous.

Advantageously, some embodiments of the present disclosure may provide for one or more of:
- automatic diagnosis for log files generated by cloud systems, without requiring input from an expert human;
- fast and efficient analysis of logs output by cloud systems to detect anomalies.
- expensive fault detection methods are triggered only when needed (i.e., only when previously unseen anomalies are detected);
- continuously learning about new faults while evaluating anomalies (which means that as time goes on, less and less of the expensive fault detection method will be required);
- very simple mechanism to extend the faults detection method to other applications, such as performance or security management; and/or
- complementary to other metrics-based solutions.

Before describing in detail exemplary embodiments, it is noted that the embodiments reside primarily in combinations of apparatus components and processing steps related to analyzing logs for anomaly and/or fault detection. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the non-limiting term computing device is used herein and can be any type of computing device capable of implementing one or more of the techniques disclosed herein. For example, the computing device may be a device in or in communication with a cloud system.

A computing device may include physical components, such as processors, allocated processing elements, or other computing hardware, computer memory, communication interfaces, and other supporting computing hardware. The computing device may use dedicated physical components, or the computing device may be implemented as one or more allocated physical components in a cloud environment, such as one or more resources of a datacenter. A computing device may be associated with multiple physical components that may be located either in one location, or may be distributed across multiple locations.

In some embodiments, the term "live log record" may be used to indicate a log record of a live, running system e.g., whose anomalies and/or faults are being detected.

In some embodiments, the term "training logs" may be used to indicate any training logs, such as, for example, synthetic training logs, historical logs, etc., and/or any logs that may be used to create the tree/tree structure disclosed in the present disclosure.

Any two or more embodiments described in this disclosure may be combined in any way with each other.

Note that although some embodiments of the example system disclosed herein may be used to detect anomalies and/or faults in cloud platforms. Other systems may also benefit from exploiting the ideas covered within this disclosure.

Note further, that functions described herein as being performed by a computing device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring again to the drawing figures, in which like elements are referred to by like reference numerals, there is shown in FIG. 1 a schematic diagram of the communication system 10, according to one embodiment, constructed in accordance with the principles of the present disclosure. The communication system 10 in FIG. 1 is a non-limiting example and other embodiments of the present disclosure may be implemented by one or more other systems and/or networks. FIG. 1 presents an overview of the different components in one embodiment of the present disclosure using data from log records in e.g., distributed clouds. The system 10 includes a tree builder 12, a computing device in the form of an anomaly detector 14 and a fault detector 16.

The tree builder 12 constructs a tree-based representation of the log records generated by an application or a system. The input of the tree builder 12 is the generated log files, such as for example historical log files from previous operations of the application or system, or training log records, i.e. for example, log records generated or used for the express purpose of training the system of the present embodiment, and the output is a log tree structure.

The anomaly detector 14 has as inputs the "live log(s)" and the created log tree structure and as outputs an alarm about a "detected anomaly" e.g. on each line of the live log. Given e.g. a new live log record/entry, the anomaly detector 14 first identifies whether the new live log record represents a normal behavior of the application, using the obtained log tree structure. If the new live log is identified not to represent the normal behavior of the application, the anomaly detector 14 raises an alarm indicating that there is an anomaly; otherwise, the anomaly detector 14 does not raise an alarm to the system.

According to the obtained output from the anomaly detector 14, there may be defined three main components that are: fault detector 16, security detector 17 and performance detector 18. In some embodiments of the present disclosure, the fault detector 16 has as input information about the detected anomaly and as output an alarm indicating detection of the presence of a fault. The fault detector 16 receives alarms when new anomalies are detected from the anomaly detector 14. Next, the fault detector 16 determines whether or not the detected anomaly has been raised before by checking similar anomalies that have been reported previously e.g., by the anomaly detector 14. In the presence of similar anomalies, the fault detector 16 reports the results/findings reported previously for the anomaly having similar characteristics. If the fault detector 16 determines that the detected anomaly (or similar anomaly) has not been previously reported, the fault detector 16 identifies whether or not this anomaly can lead to a fault or not using, for example, one or more unit tests. Given the findings of the previous step, the fault detector 16 determines that such anomalies are associated with that specific fault when the test suite indicates that the detected anomaly can lead to a fault. Then, the fault detector 16 reports the detected fault.

If the fault detector 16 determines that the detected anomaly is not associated with a fault, the fault detector 16 determines that such anomalies are e.g. false positives and causes the tree structure to be updated in order to prevent such anomalies to be raised in the future.

In some embodiments, one or more of the anomalies detected and the fault detected alarms may be inputs to one or more of the security detector 17 and performance detector 18 to, e.g., improve security and/or performance of the system.

It should be understood that the system 10 may include numerous devices of those shown in FIG. 1, as well as, additional devices not shown in FIG. 1. In addition, the system 10 may include many more connections/interfaces than those shown in FIG. 1.

The system 10 may include one or more devices having a builder 32 and a detector 34. In one embodiment, the tree builder 12 includes a builder 32 configured to obtain one or more training log records; and/or build a tree structure using the one or more training log records, the tree structure including a plurality of tree nodes, each successive tree node in a root-to-leaf path of the tree structure representing successive log elements of the one or more training log records, and each of the one or more training log records including one or more log elements.

In one embodiment, the anomaly detector 14 includes a detector 34 configured to obtain a live log record; and/or determine an anomaly in the live log record by comparing successive elements of the live log record to successive nodes in a root-to-leaf direction of the tree structure, the tree structure including a plurality of tree nodes, each successive tree node in the root-to-leaf path of the tree structure representing successive log elements of one or more training log records, and each of the one or more training log records including at least one log element.

Example implementations, in accordance with some embodiments, of tree builder 12, anomaly detector 14 and fault detector 16 will now be described with reference to FIG. 2.

The tree builder 12 includes a communication interface 40, processing circuitry 42, and memory 44. The communication interface 40 may be configured to communicate with any of the elements of the system 10 according to some embodiments of the present disclosure. In some embodiments, the communication interface 40 may be formed as or may include, for example, one or more radio frequency (RF) transmitters, one or more RF receivers, and/or one or more RF transceivers, and/or may be considered a radio interface. In some embodiments, the communication interface 40 may also include a wired interface.

The processing circuitry 42 may include one or more processors 46 and memory, such as, the memory 44. In particular, in addition to a traditional processor and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 46 may be configured to access (e.g., write to and/or read from) the memory 44, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the tree builder 12 may further include software stored internally in, for example, memory 44, or stored in external memory (e.g., database) accessible by the tree builder 12 via an external connection. The software may be executable by the processing circuitry 42. The processing circuitry 42 may be configured to control any of the methods and/or processes described herein and/or to cause such methods, and/or processes to be performed, e.g., tree builder 12 and/or builder 32. The memory 44 is configured to store data, programmatic software code and/or other information described herein. In some embodiments, the software may include instructions stored in memory 44 that, when executed by the processor 46 and/or builder 32 causes the processing circuitry 42 and/or configures the tree builder 12 to perform the processes described herein with respect to the tree builder 12 (e.g., processes described with reference to FIG. 3 and/or any of the other figures).

The anomaly detector 14 includes a communication interface 50, processing circuitry 52, and memory 54. The communication interface 50 may be configured to communicate with any of the elements of the system 10 according to some embodiments of the present disclosure. In some embodiments, the communication interface 50 may be formed as or may include, for example, one or more radio frequency (RF) transmitters, one or more RF receivers, and/or one or more RF transceivers, and/or may be considered a radio interface. In some embodiments, the communication interface 50 may also include a wired interface.

The processing circuitry 52 may include one or more processors 56 and memory, such as, the memory 54. In particular, in addition to a traditional processor and memory, the processing circuitry 52 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 56 may be configured to access (e.g., write to and/or read from) the memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the anomaly detector 14 may further include software stored internally in, for example, memory 54, or stored in external memory (e.g., database) accessible by the anomaly detector 14 via an external connection. The software may be executable by the processing circuitry 52. The processing circuitry 52 may be configured to control any of the methods and/or processes described herein and/or to cause such methods, and/or processes to be performed, e.g., by the anomaly detector 14. The memory 54 is configured to store data, programmatic software code and/or other information described herein. In some embodiments, the software may include instructions stored in memory 54 that, when executed by the processor 56 and/or detector 34, causes the processing circuitry 52 and/or configures the anomaly detector 14 to perform the processes described herein with respect to the anomaly detector 14 (e.g., processes described with reference to FIG. 4 and/or any of the other figures).

The fault detector 16 includes a communication interface 70, processing circuitry 72, and memory 74. The communication interface 70 may be configured to communicate with any of the elements of the system 10 according to some embodiments of the present disclosure. In some embodiments, the communication interface 70 may be formed as or may include, for example, one or more radio frequency (RF) transmitters, one or more RF receivers, and/or one or more RF transceivers, and/or may be considered a radio interface. In some embodiments, the communication interface 70 may also include a wired interface.

The processing circuitry 72 may include one or more processors 76 and memory, such as, the memory 74. In particular, in addition to a traditional processor and memory, the processing circuitry 72 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 76 may be configured to access (e.g., write to and/or read from) the memory 74, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the fault detector 16 may further include software stored internally in, for example, memory 74, or stored in external memory (e.g., database) accessible by the fault detector 16 via an external connection. The software may be executable by the processing circuitry 72. The processing circuitry 72 may be configured to control any of the methods and/or processes described herein and/or to cause such methods, and/or processes to be performed, e.g., by the fault detector 16. The memory 74 is configured to store data, programmatic software code and/or other information described herein. In some embodiments, the software may include instructions stored in memory 74 that, when executed by the processor 76, causes the processing circuitry 72 and/or configures the fault detector 16 to perform the processes described herein with respect to the fault detector 16.

Figure 2:
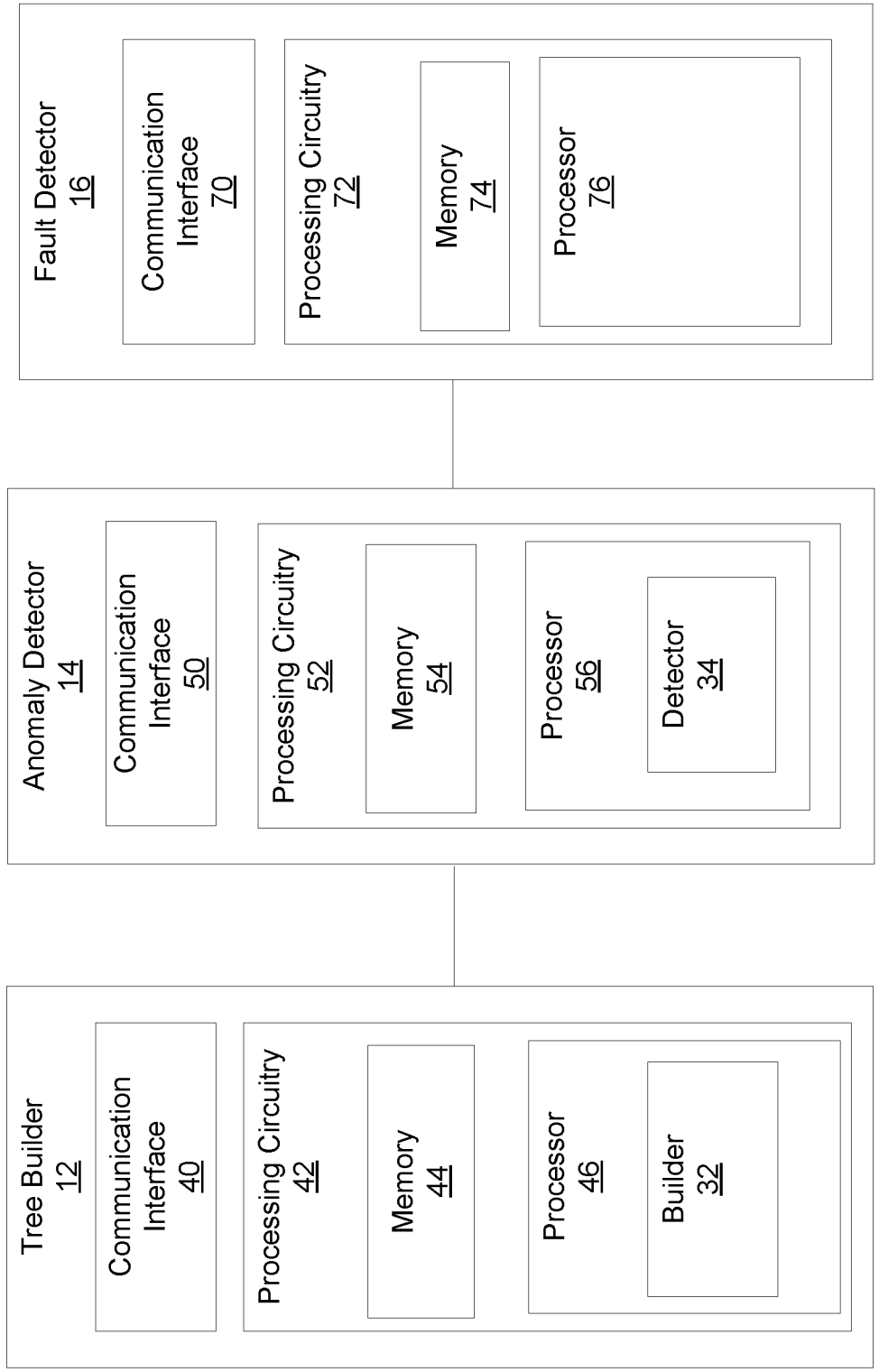
FIG. 2 illustrates yet another example system architecture and example hardware arrangements for devices in the system, according to some embodiments of the present disclosure.

In FIG. 2, the connection between the devices tree builder 12, anomaly detector 14 and fault detector 16 is shown without explicit reference to any intermediary devices or connections. However, it should be understood that intermediary devices and/or connections may exist between these devices, although not explicitly shown.

In addition, it should be understood that although the system 10 is shown here with the tree builder 12, anomaly detector 14 and fault detector 16 being separate devices in communication with one another, in some embodiments, any two or more of the tree builder 12, anomaly detector 14 and fault detector 16 (and/or any of the processes and/or function associated therewith) may be implemented in a single device.

Although FIG. 2 shows builder 32 and detector 34, as being within a respective processor, it is contemplated that these elements may be implemented such that a portion of the elements is stored in a corresponding memory within the processing circuitry. In other words, the elements may be implemented in hardware or in a combination of hardware and software within the processing circuitry.

Figure 3:
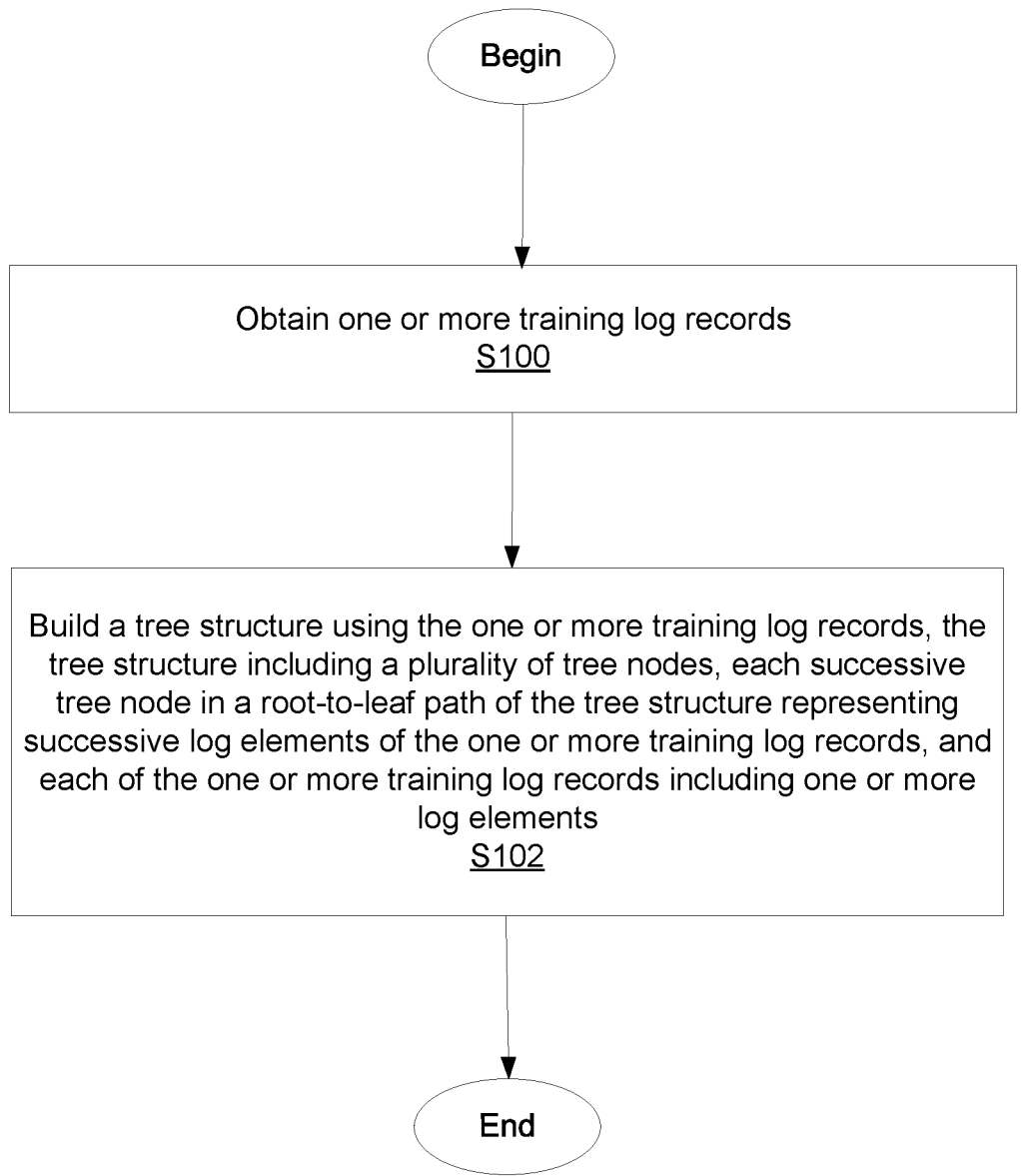
FIG. 3 is a flowchart of an example process in computing device for building a tree structure according to some embodiments of the present disclosure.

FIG. 3 is a flowchart of an example process in a tree builder 12 for e.g., building a tree structure according to some embodiments of the present disclosure. One or more Blocks and/or functions and/or methods performed by the tree builder 12 may be performed by one or more elements of tree builder 12 such as by builder 32 in processing circuitry 42, memory 44, processor 46, communication interface 40, etc. according to the example process/method. The example method includes obtaining (Block S100), such as via builder 32, processing circuitry 42, memory 44, processor 46, and/or communication interface 40, one or more training log records, or historical log records. The method includes building (Block S102), such as via builder 32, processing circuitry 42, memory 44, processor 46, and/or communication interface 40, a tree structure using the one or more training log records. The tree structure includes a plurality of tree nodes. Each successive tree node in a root-to-leaf path of the tree structure represents successive log elements of the one or more training log records. Each of the one or more training log records includes one or more log elements. In some embodiments, the one or more training log records may be historical logs for the system.

In some embodiments, the method further includes providing, such as via builder 32, processing circuitry 42, memory 44, processor 46, and/or communication interface 40, the built tree structure for detecting a system fault. In some embodiments, the tree structure represents a behavior considered as normal of a system. In some embodiments, building the tree structure using the one or more training log records further includes, for each of the one or more training log records, splitting, such as via builder 32, processing circuitry 42, memory 44, processor 46, and/or communication interface 40, the training log record into a list of successive log elements and associating the successive log elements in the list to successive tree nodes in the tree structure.

In some embodiments, building the tree structure using the one or more training log records further includes assigning, such as via builder 32, processing circuitry 42, memory 44, processor 46, and/or communication interface 40, a frequency value to at least certain ones of the tree nodes in the tree structure (or to each of them), the frequency value indicating how often the one or more training log records includes the log element associated with the tree node. In some embodiments, the certain ones of the tree nodes include all the nodes of the tree structure.

Figure 4:
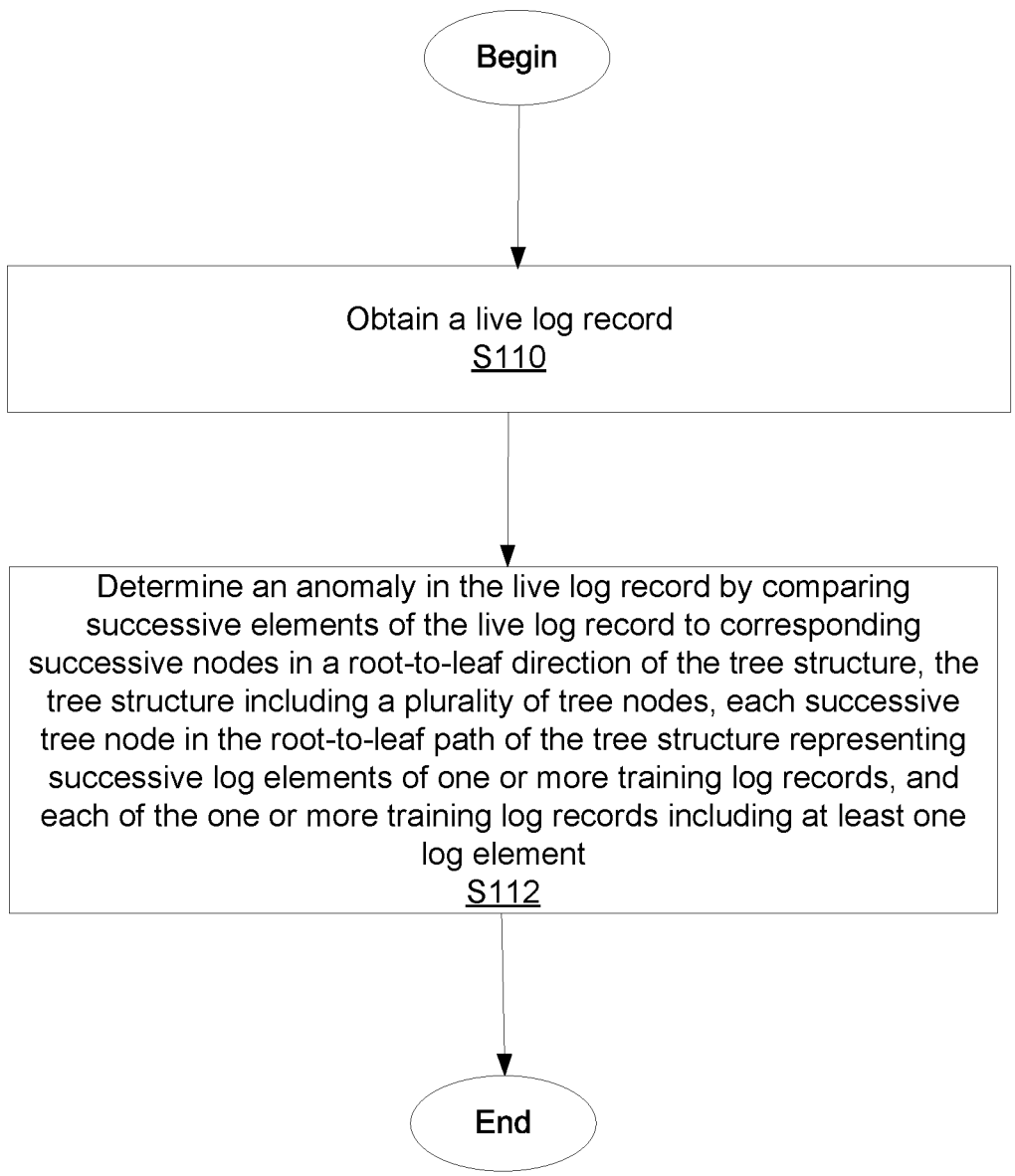
FIG. 4 is a flowchart of an example process in a computing device for detecting an anomaly using the tree structure according to some embodiments of the present disclosure.

FIG. 4 is a flowchart of an example process in anomaly detector 14 and/or fault detector 16 for e.g., detecting an anomaly and/or fault using the log tree structure according to some embodiments of the present disclosure. One or more Blocks and/or functions and/or methods performed by the anomaly detector 14 (or in some embodiments by the fault detector 16) may be performed by one or more elements of anomaly detector 14 such as, for example, detector 34 in processing circuitry 52, memory 54, processor 56, communication interface 50, etc. according to the example process/method. The example method includes obtaining (Block S110), such as via detector 34, processing circuitry 52, memory 54, processor 56 and/or communication interface 50, a live log record. The method includes determining (Block S112), such as via detector 34, processing circuitry 52, memory 54, processor 56 and/or communication interface 50, an anomaly in the live log record by comparing corresponding successive elements of the live log record to successive nodes in a root-to-leaf direction of the tree structure. The tree structure includes a plurality of tree nodes. Each successive tree node in the root-to-leaf path of the tree structure represents successive log elements of one or more training log records. Each of the one or more training log records includes at least one log element.

In some embodiments, the method further includes comparing, such as via detector 34, processing circuitry 52, memory 54, processor 56 and/or communication interface 50, a first log element of the incoming live log record with a first node of the tree structure and finding a match therebetween; comparing a next second log element of the incoming live log record with one or more children nodes of the first node of tree structure; and concluding to an anomaly if none of the children nodes matches the next second log element of the incoming live log record.

In some embodiments, determining the anomaly in the live log record by comparing the live log record to the tree structure further includes mapping, such as via detector 34, processing circuitry 52, memory 54, processor 56 and/or communication interface 50, the obtained live log record to a corresponding tree path of the tree structure; and determining at least one difference between tree node values of the corresponding tree path and corresponding log elements of the live log record. In some embodiments, the tree structure represents a behavior considered as normal of a system. In some embodiments, comparing the live log record to the tree structure further includes traversing, such as via detector 34, processing circuitry 52, memory 54, processor 56 and/or communication interface 50, a path along the tree structure, the path to traverse being determined by reading successive log elements in the live log record.

In some embodiments, each of the read successive log elements in the live log record determines which next tree node to traverse along the tree structure. In some embodiments, determining the anomaly in the live log record further includes identifying, such as via detector 34, processing circuitry 52, memory 54, processor 56 and/or communication interface 50, the live log record is an anomaly when one of the live log record elements either does not match any tree node in the tree structure or matches a tree node of the tree structure that has a frequency below a certain threshold. The frequency represents the number of times the node value has been recorded in training records.

In some embodiments, the method further includes if the live log record is determined to be an anomaly, initiating, such as via detector 34, processing circuitry 52, memory 54, processor 56 and/or communication interface 50, determining whether the anomaly is a fault. In some embodiments, the method further includes if the anomaly is determined not to be a fault, causing, such as via detector 34, processing circuitry 52, memory 54, processor 56 and/or communication interface 50, the tree structure to be updated with the live log record. In some embodiments, initiating determining whether the anomaly is a fault further includes initiating, such as via detector 34, processing circuitry 52, memory 54, processor 56 and/or communication interface 50, determining whether the anomaly was previously detected; and if the anomaly was previously determined to be a fault, reporting the fault; otherwise, initiating a test to determine if the anomaly is a fault.

Having generally described arrangements for building a tree structure using log records and using the log tree structure to detect an anomaly and/or a fault, a more detailed description of some of the embodiments are provided as follows with reference to FIGS. 5-10, and which may be implemented by may be implemented by any one or more of tree builder 12, anomaly detector 14 and/or fault detector 16.

To demonstrate how embodiments of the present disclosure work, example log records from an example application (the Hadoop application) are used to identify fault conditions. To do so, a part of the public log records of the Hadoop Distributed File System (HDFS) are shown, for example, in FIG. 5.

Building a Log Tree Structure

In some embodiments, the tree builder 12 is configured to read the log records generated by an application or system over a period of time, such as, for example, over several months from e.g., distributed clouds. The tree builder 12 may analyze the log records for identifying its content by building a tree-based data structure.

The tree may represent a hierarchical tree structure with, for example, a root node, subtrees of children nodes with a parent node (which may be represented as a set of linked nodes) and leaf nodes that do not have a child node in the tree. Nodes may be considered to be connected by edges and each node may represent information (e.g., each node be a data structure that includes one or more values or data and may also link to other nodes in the tree via e.g., pointers). The depth of a node may be considered a length or distance of the path to its root node.

To achieve the goal of building a tree to e.g., represent a normal system behavior according to the techniques disclosed herein, the tree builder 12 may perform one or more of the following methods/functions.

Split_Line_2_Terms (Line, LIMIT)

In one example embodiment, this split line function may take as inputs one or more log record line(s) and a LIMIT variable. The split line function returns an ordered list of terms (also referred to herein as log elements) obtained by splitting the line (in some embodiments, each line may be considered to correspond to 1 log record) and appending a special token that signifies the end of a line. If the number of terms/log elements exceeds LIMIT, the function may return the part of line that exceeds LIMIT as a term without splitting. Different rules can be applied to split the line. An example rule is to split the line at every non-alphanumeric character (e.g., a space, punctuation such as a period, colon, etc.) excluding '-' and "_". Examples of the output of this function for the first line would be, for the first log record shown in FIG. 5: ['081109', '203518', '143', 'INFO', 'dfs', 'DataNode', 'DataXceiver', 'Receiving', 'block', 'blk_-1608999687919862906', 'src', '10', '250', '19', '102', '54106', 'dest', '10', '250', '19', '102', '50010', '_____end_log']).

Compress_Tree (Subtree)

In some embodiments, a compress tree function may be used by the tree builder 12. The function may take as an input a subtree and output a compressed subtree structure. For grouping here, a technique may be used to identify those variable parts of the log records like identifiers (IDs), date/time, Internet Protocol (IP) addresses, etc. that can be grouped together. Different techniques can be applied to identify things that can be grouped together. One rule may be, for instance, to group terms/log elements on whether they are numbers or not. For example, if the subtree has three children ['081109', '081111', '081110'], then this may be compressed into ['_____int']. In general, better results can be achieved by adding more complex rules for grouping.

For example, for the largest subset of children of subtree that can be merged together, tree builder 12 may perform one or more of the following:

compressed_subtree=merge_tree(children's subtrees)
    remove children from subtree;
    add compressed_subtree to subtree with a label that
      identifies the type of merged children; and
    for each child in subtree:
      call recursively compress_tree with the subtree associated with the child as an input parameter.

Merge_Tree (Subtrees)

In some embodiments, the merge tree function discussed above may perform the following, described in pseudo code:
  new_subtree=empty tree with COUNT=0;
  for each subtree s in subtrees:
    add the COUNT of s to new_subtree's COUNT;
    for each child node c in subtree s:
      if c is not in new_subtree:
        add c and its associated subtree in s to new_subtree;
      else:
        temp=merge_tree (children in subtree s and new_subtree associated with child node c); and
        add c associated with temp to new_subtree;
  return subtree.

Having generally described some of the functions that may be used to build a tree, one example of the steps of a tree builder algorithm that may be implemented by the tree builder 12 according to some embodiments of the present disclosure is described with reference to the flowchart in FIG. 6. The following are examples of the inputs into and outputs of the example tree builder algorithm.

Input:
  LOGS—list of log entries/log records of an application, e.g. collected over time from different locations, or records specifically made to act as training records (e.g., training log records).
  MAX_DEGREE—the maximum number of children a (sub)tree can have.
  LIMIT—the maximum allowed depth of the tree.
Output:
  TREE—A tree-based representation of the structure of the log records of the application.

Figure 6:
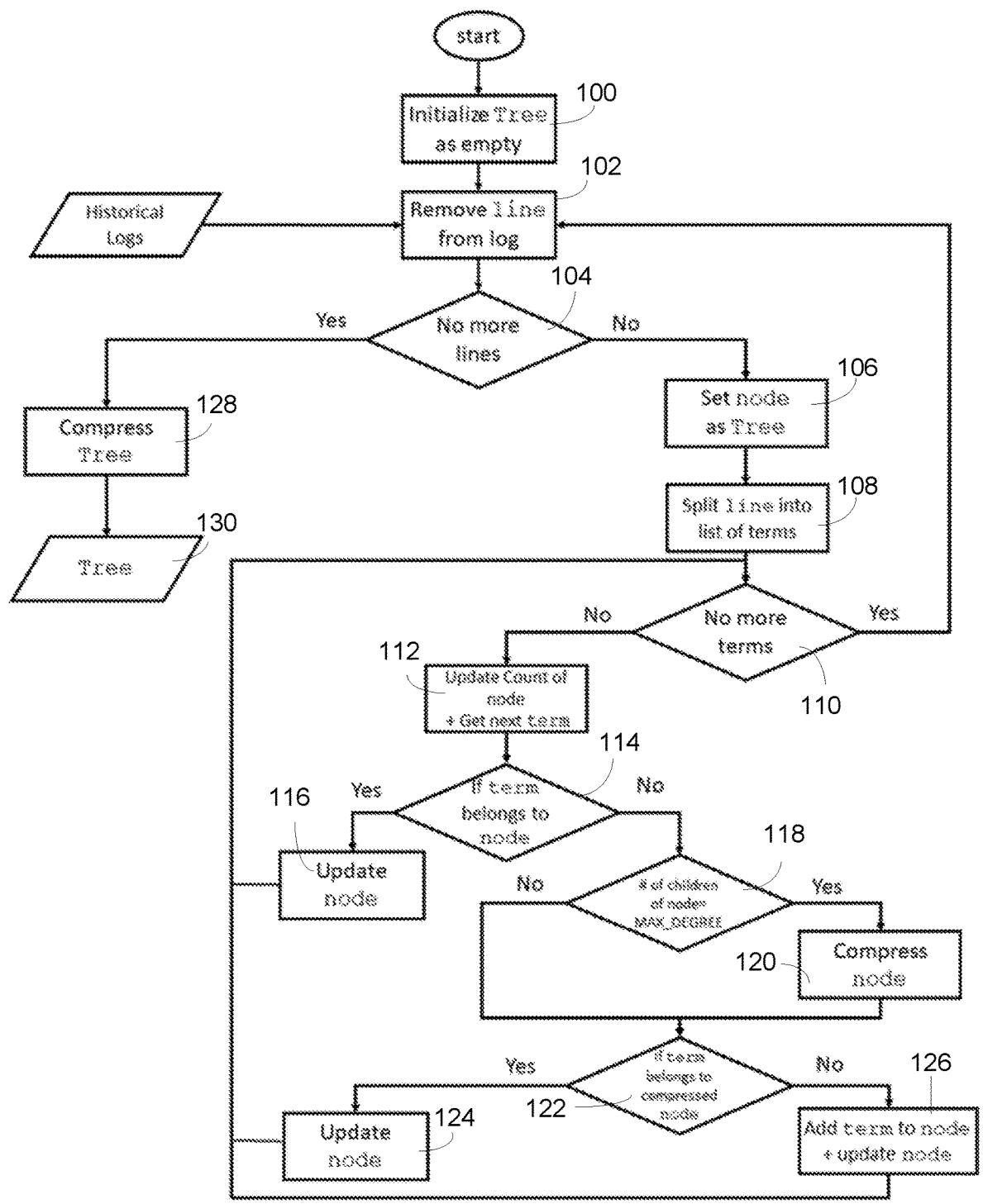
FIG. 6 is flowchart of an example process for building a log tree structure according to one embodiment of the present disclosure.

The following represents general pseudocode of the example tree builder algorithm, with reference to the flowchart in FIG. 6.

In step 100, the tree is initialized. TREE=empty tree with COUNT=0.
While LOGS is not empty, perform the following:
  In step 102, remove a line from LOGS. line=remove a random line from LOGS.
  In step 104, determine whether or not there are no more lines. If no (i.e., if there are lines), in step 106, set node as TREE. node=TREE.
  In step 108, split the line into its terms/log elements. term_list=split_line_2_terms (line).
  In step 110, while term_list is not empty do the following:
    In step 112, increase/increment COUNT of node. term=remove first term from term_list.

In step 114, if the term belongs to the node, then update node in step 116. For example, if node includes a child labelled term:
node=child of node labelled term; and
proceed with next term of the line.
In step 118, if the number of children of node is equal to MAX_DEGREE:
in step 120, compress_tree (node).
In step 122, if term belongs to a compressed child of node, update node. For example, in step 124:
node=compressed child of node to which the term belongs to; and
proceed with next term of the line.
If the term does not belong to compressed node, then proceed to step 126, where the term is added to node and the node is updated. For example, add a new child tree to node labelled term. node=child of node labelled term; and proceed with next term.
The rate at which new children nodes are created, compared to the rate at which lines are added to the TREE may give an indication of how well the tree generalizes to the LOG file. For instance, if no new children are created for a while, it may mean that the addition of new lines doesn't really add to the betterment of the tree.
Repeat the above steps continuing to remove lines from the LOG, splitting the lines into terms/log elements and updating the tree structure accordingly.
If there are no more lines in TREE:
in step 128, compress_tree (TREE); and
in step 130, return TREE. The TREE structure that is returned may be considered the built tree.

Figure 7:
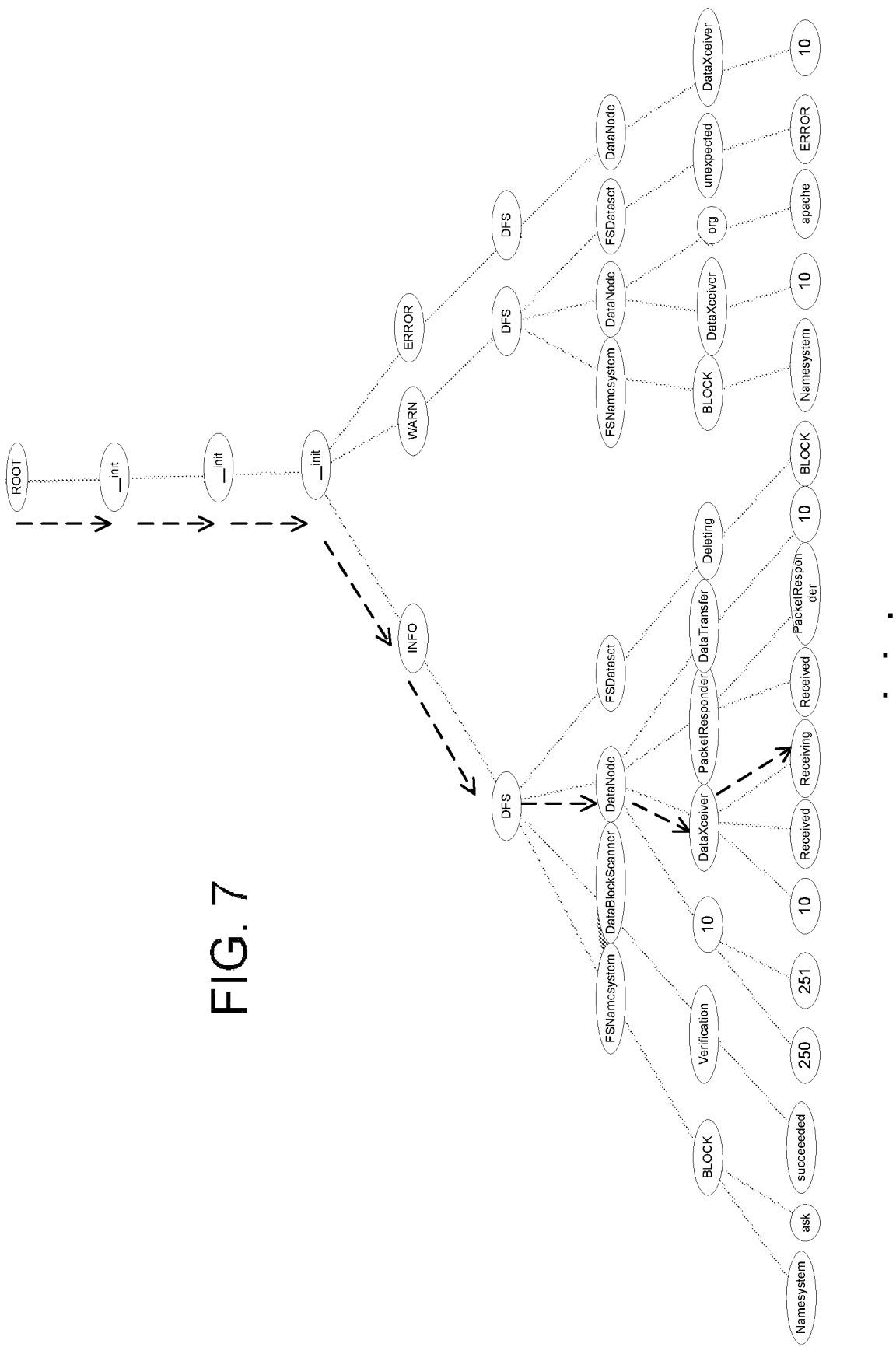
FIG. 7 is an example log tree structure according to some embodiments of the present disclosure.

FIG. 7 shows a visual representation of an example tree structure built from the log records (such as the log records depicted in FIG. 5), truncated to level 8 for simplicity here. Referring to FIGS. 5 and 7, one example is described for how successive log elements (e.g., $1^{st}$ log element to nth log element in a log record shown in FIG. 5) can be used to build the nodes in the tree structure (e.g., tree structure in FIG. 7) according to the techniques disclosed herein. Taking the $1^{st}$ log record identified in FIG. 5, the path from the root node toward a leaf node (truncated at level 8) for the first log record shown in FIG. 5 is indicated by the arrows in FIG. 7. The number elements have been grouped together into ['\_\_\_\_\_int'] nodes and each successive node in the path represents a successive log element. For example, the first three log elements of the first log record in FIG. 5 are integers, 081109, 203518 and 143, which are shown compressed into node ['\_\_\_\_\_int'], node ['\_\_\_\_\_int'] and ['\_\_\_\_\_int'] in the example tree structure in FIG. 7. For example, a large number of logs having the same three integers as the first three log elements in the example may have been compressed (as described in the pseudo code above for example) for efficiency in e.g., reading successive nodes in the tree structure.

The next successive log element in FIG. 5 is shown as "INFO", which corresponds to the next successive tree node in the tree structure of FIG. 7 shown as node "INFO". The next successive log element in FIG. 5 is shown as "dfs", which corresponds to the next successive tree node in the tree structure in FIG. 7 shown as node "DFS." The next successive log element in FIG. 5 is shown as "DataNode", which corresponds to the next successive tree node in the tree structure in FIG. 7 shown as node "DATANODE." Since the tree builder 12 may split the line into terms/log elements at every non-alphanumeric character (e.g., $), the next term/log element in the log record in FIG. 5 should be "DataXceiver", which corresponds to the next successive tree node in the tree structure in FIG. 7 shown as node "DataXceiver". Continuing further, the next successive log element in FIG. 5 is "Receiving", which corresponds to the node "Receiving" shown in FIG. 7 as the next successive tree node in the example tree structure. Again, during the line splitting, the non-alphanumeric characters colon and space (between "DataXceiver" and "Receiving") split these into two terms/log elements. The tree structure in FIG. 7 has been truncated due to the page size limitations and readability; however, it should be apparent from this example how the rest of the log elements in the log record can be used to construct a log tree.

In some embodiments, after the first log record (e.g., training log record) is used to construct the tree, additional log records (e.g., historical/training log records) may be used to further construct and build out the tree structure so as to e.g., represent a normal behavior of a system based on training log records, which may then be sent to an anomaly detector 14 that may compare live log records to the tree structure in order to e.g., detect anomalies.

Once the tree structure is built by e.g., tree builder 12, checking for anomalies using the tree structure may be very fast. For example, using the tree structure built from the public log records of HDFS, more than 30,000 lines of log records per second were able to be checked using a python program and using only a single processor core.

Detecting an Anomaly

Figure 8:
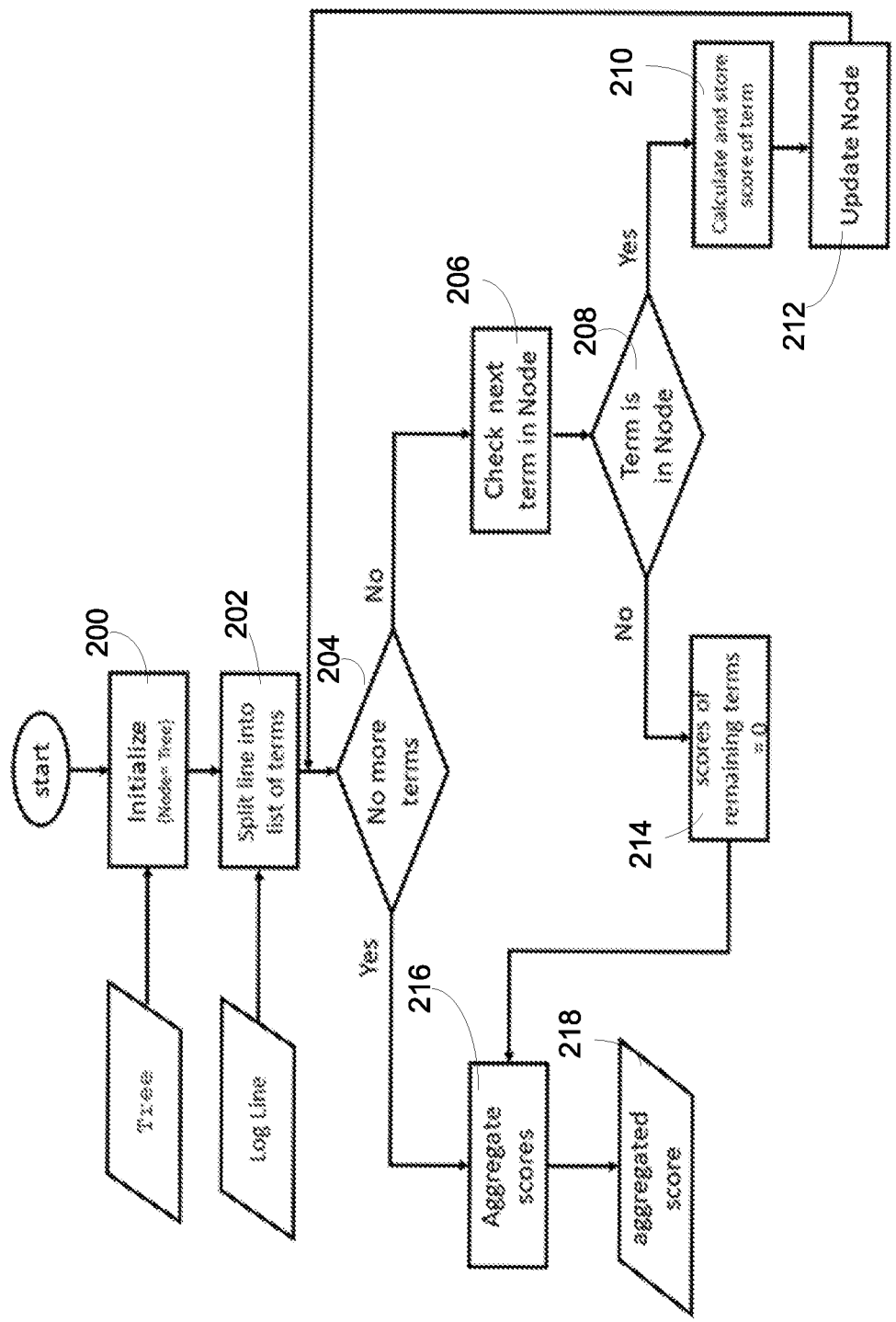
FIG. 8 is a flowchart of an example scoring method that may be used according to some embodiments of the present disclosure.

FIG. 8 is a flowchart representing an example log record/line scoring algorithm that may be implemented by e.g., tree builder 12 and/or anomaly detector 14.

In some embodiments, the core of an anomaly detector algorithm is a method for calculating the score of a log record/line, which the disclosure calls ScoreLine. The output of a scoring algorithm, such as ScoreLine, may be a score of the log record, which may be considered a measure of how 'normal' a log record is. In some embodiments, a threshold on the score of a log record may be identified so as to be able to either mark the log record as anomaly or not. Depending on how the anomaly detector algorithm is used, the threshold can be initialized in different ways.

In a general case, the value of the threshold is non-zero. However, in a specific embodiment where the tree builder algorithm is trained with log records that are known to be normal and not anomalous, the threshold may be set to 0 (or the minimum value possible for an aggregation function that may be used in ScoreLine). This may be achieved by setting the FRACTION_OF_ANOMALY value to 0.

In the following, the pseudocode of an example Score-Line algorithm that calculates the score of a log record (e.g., a live log record/line) using the built tree structure according to the techniques in the present disclosure is provided. The following are examples inputs and outputs for ScoreLine:
Input:
TREE—log Tree built from the log records output of a system (e.g., tree from step 130 of FIG. 7).
LINE—a log record to evaluate.
MAX_DEPTH—the maximum depth of the tree.
Output:
SCORE—An aggregated score for the given log record.
The following represents general pseudocode of the example ScoreLine algorithm, with reference to the flowchart in FIG. 8.

The built TREE is received by e.g., anomaly detector 14, and in step 200, initialize node to TREE. node=TREE.

A log record/line that is to be evaluated (e.g., live log record) may be received and, in step 202, split the line into a list of terms/log elements. term_list=split_line_2_terms(LINE, MAX_DEPTH).
Initialize scores. scores=empty list of numbers.
In step 204, determine whether or not there are no more terms. If no (i.e., if there are more terms) proceed to step 206. For each term in term_list, perform the following:
In step 208, if term is in node (e.g., if the term/log element matches the term represented by the node being checked, e.g., term/log element=INFO of the live log record matches to the node value of INFO):
next_node=subtree of node associated with term (this may allow the program to traverse the correct path following successive nodes that represent terms/log elements that match the successive log elements of the live log record);
in steps 210 and 212, calculate and store the score of the term and update the node. For example, term_score=COUNT of node/COUNT of next_node. In some embodiments, the term_score may represent or take into account a frequency value indicating how often training log records include the log element associated with the node). In some embodiments, the term_score may represent or take into account yet another indication or parameter that may be used to determine how 'normal' the live log record is and therefore whether the live log record may be an anomaly. In some embodiments, a score for the term may be used to determine whether or not there is an anomaly. For example, the score may be compared to a predetermined threshold value and if the score meets or exceeds or is less than the threshold value, an anomaly may be flagged.
append term_score to scores.
node=next_node.
proceed with next term and return to step 204.
else (if in step 208, term is not in node) (e.g., if the term/log element does not match any term represented by any of the next/successive nodes in the tree, e.g., term/log element=xyz of the live log record does not match any of the next/successive node values):
in step 214, for the remaining term(s) in term_list append 0 to scores; and
terminate for loop.
In step 216, the scores may be aggregated and in step, 218, return an aggregated SCORE from scores. Different aggregation mechanisms may be used in different embodiments. For example, one embodiment is to take the minimum score from the list of scores as the score of the LINE. Other aggregation techniques may also be used in other embodiments.
In some embodiments, a score for the live log record (and/or or aggregated score) may be used to determine whether or not there is an anomaly. For example, the score may be compared to a predetermined threshold value and if the score meets or exceeds or is less than the threshold value, an anomaly may be flagged for the live log record.

Figure 9:
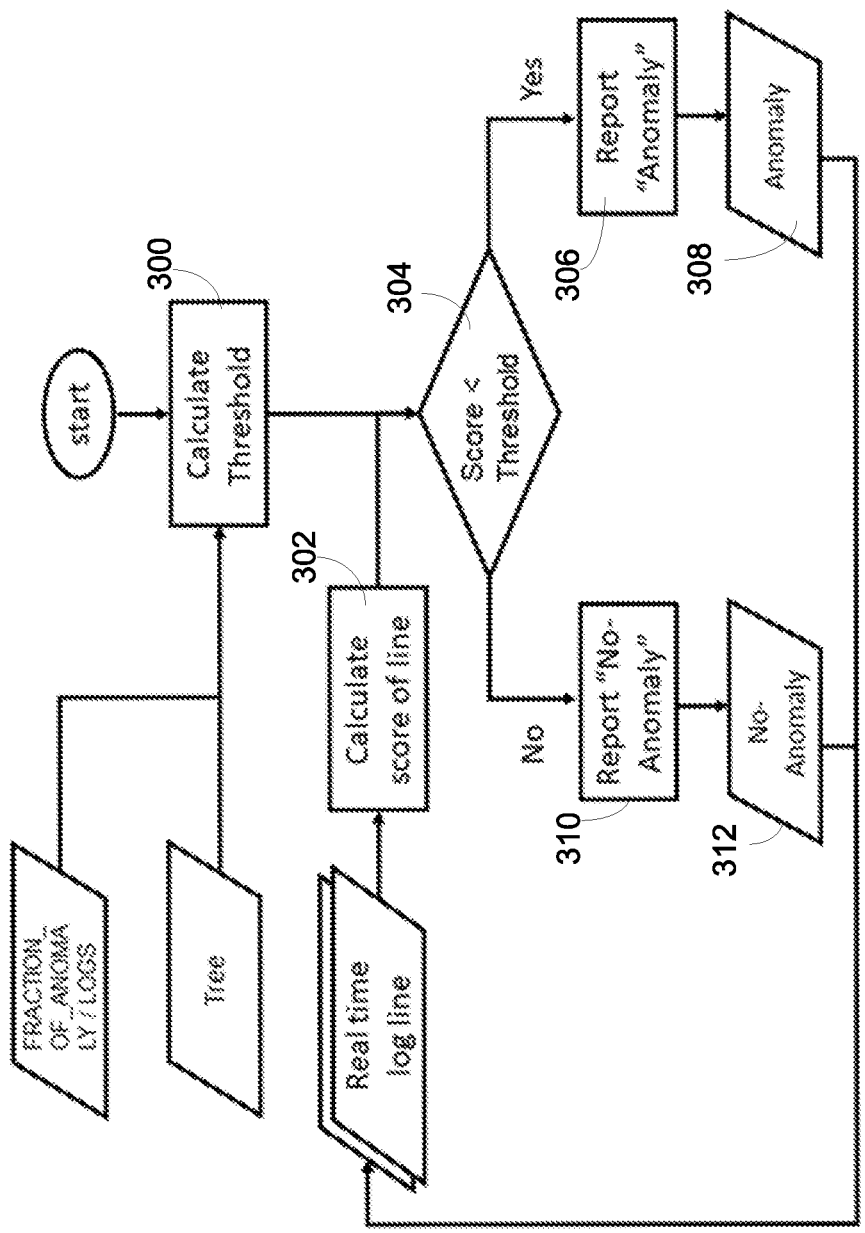
FIG. 9 is a flowchart of an example method of identifying whether or not there is an anomaly according to some embodiments of the present disclosure.

FIG. 9 is a flowchart for an example anomaly detector algorithm that may be implemented by e.g., anomaly detector 14. The following represents example inputs and output(s) of the anomaly detector algorithm.
Input:
TREE—log Tree built from the log output of a system (e.g., tree from step 130 of FIG. 7).
LINE—a log record to evaluate.
MAX_DEPTH—the maximum depth of the tree.
LOGS—list of log records of an application.
FRACTION_OF_ANOMALY—fraction of LOGS entries expected to be as anomalies.
Output:
Anomaly Alarm—identifies whether there is an anomaly or not.

The following describes an example pseudocode for the anomaly detector, described with reference to the flowchart of FIG. 9.
In step 300, the threshold is determined. For example, if FRACTION_OF_ANOMALY=0:
THRESHOLD=0.
else:
scores=a list of the scores of each entry in LOGS.
Choose the largest THRESHOLD such that the faction of entries with score less than THRESHOLD is less than or equal to the FRACTION_OF_ANOMALY.
While a system is running,
get LINE from a live log record of the system and, in step 302, the score of the line may be determined by e.g., ScoreLine(LINE) function described herein above, which may return a score of the live log record. It should be understood that the term "score" is used herein very generally and may in fact be any value that can be used to determine whether there is an anomaly or not.
In step 304, compare the score of the LINE to a threshold. If ScoreLine(LINE)<THRESHOLD,
return True (There is an anomaly) and report and/or handle the anomaly in steps 306 and 308;
else,
return False (There is no anomaly) and report and/or handle the non-anomaly in steps 310 and 312. The anomaly or non-anomaly may be recorded internally to anomaly detector 14 and/or reported externally, such as to fault detector 16.

Detecting a Fault

Figure 10:
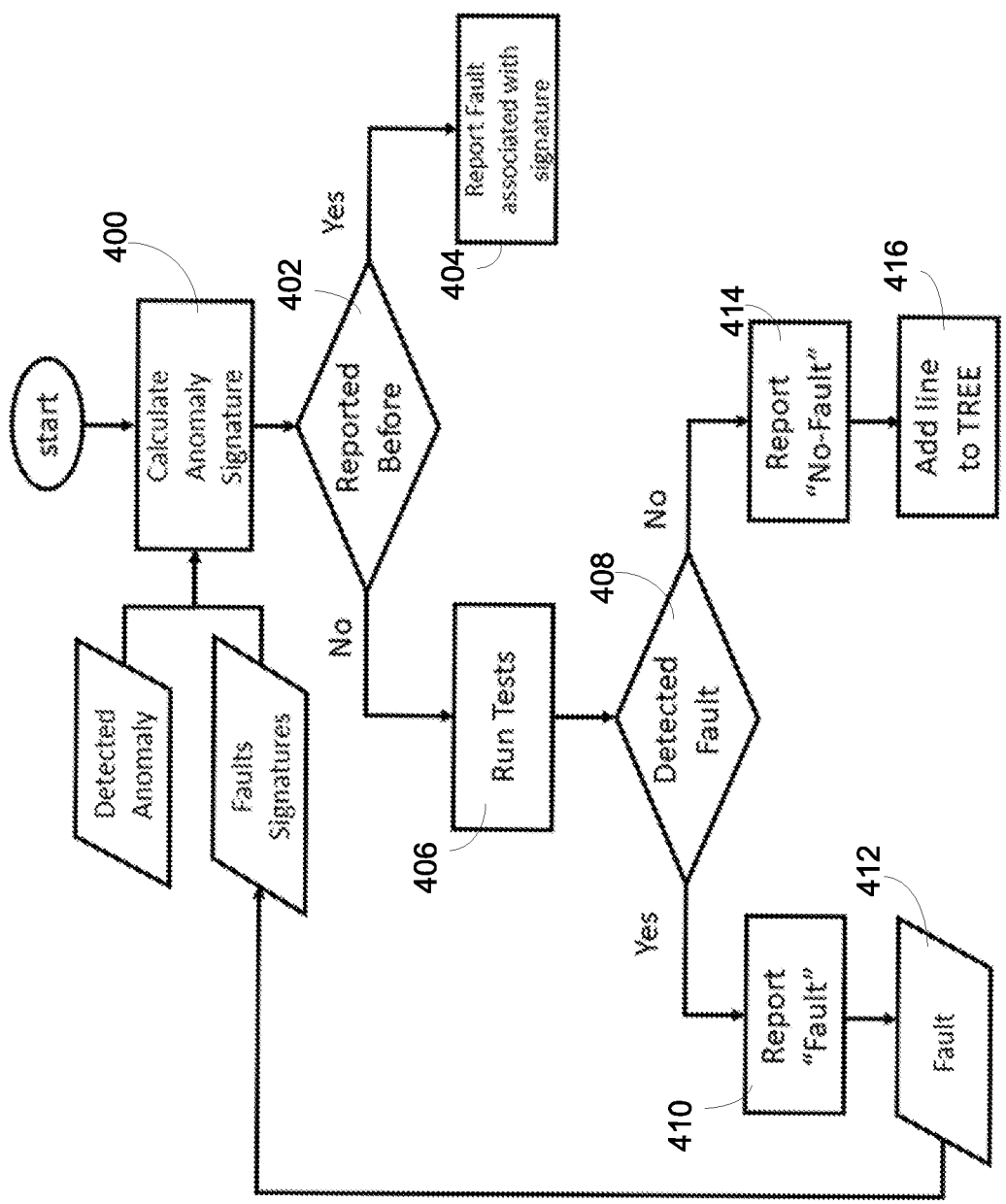
FIG. 10 is an example method of identifying whether or not there is a fault according to some embodiments of the present disclosure.

In this section, the pseudocode of an example fault detector algorithm is described with reference to the flowchart in FIG. 10 and which may be implemented by fault detector 16. The following is a list of examples inputs and outputs to the fault detector algorithm:
Input:
DETECTED_ANOMALY—output of the anomaly detector algorithm.
LIST OF SIGNATURES—List of detected faults' SIGNATURES—A signature of an anomaly may be considered something that identifies that specific anomaly. A signature can be computed using different techniques. One way to compute a signature is to be to identify the path the log records follows matching through the tree and the first term in the term list of the log entry that does not match the tree. For systems that generate a lot of anomalies, the signatures can be stored in a tree structure similar to that of the Log Tree for fast lookup of signatures.
Output:
FAULT ALARM—identifies whether the detected alarm is a fault or not.

The following describes the example pseudocode for the fault detector 16 and/or detector 34, described with reference to the flowchart of FIG. 10.
An indication of a detected anomaly may be received by fault detector 16 and/or detector 34 from e.g., anomaly detector 14. In step 400, a signature of the DETECTED_ANOMALY may be calculated.

If, in step 402, the signature is determined to have been reported before, e.g., found in the LIST OF SIGNATURES:
    in step 404, a fault associated with the found signature is reported;

else, (e.g., signature has not been previously determined to be a fault)
    in step 406, one or more tests may be run to check the system for faults. Several techniques to minimize or avoid running tests to detect faults can be employed here. For example, one approach may be to integrate this solution with a fault recovery component. In this case, once a fault is detected, all subsequent anomalies can be attributed with this same fault (without the fault detection method again) until the fault is recovered.

If a fault detected:
        Add the signature and its associated fault to the LIST OF SIGNATURES; and
        return True (i.e., there is a fault). In step 410, the fault may be reported and in step 412, the LIST OF SIGNATURES may be updated with the new fault.
    else (e.g., if a fault is not detected for the anomaly):
        add a line (e.g., log record node path) to the anomaly detection TREE to represent the line/log record that was flagged as an anomaly yet determined to not be a fault (by e.g., executing one iteration on the while loop from algorithm TreeBuilder); and
        return False (There is no fault). In step 414, the non-fault may be reported and in step 416, the TREE may be updated with the line/log record so that the log record does not trigger an anomaly in the future.

Some embodiments of the present disclosure may be implemented and deployed within any distributed or centralized cloud system that generates log records/files.

Some embodiments of the present disclosure may provide a system for detecting faults in computer systems from the log output by the system. The system may include one or more of the following three methods:
- a method that builds a tree-based representation to capture the structure of the log output by the system from its historical log output;
- a method that uses the tree built by the above method to classify log outputs as anomalous or normal; and/or
- a method that verifies whether an anomaly indeed indicates a fault in the system.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method implemented in a computing device for building a tree structure to represent a system behavior, the method comprising:
   obtaining, by the computing device, one or more training log records; and
   building, by the computing device, a tree structure using the one or more training log records, the tree structure including a plurality of tree nodes, each successive tree node in a root-to-leaf path of the tree structure representing successive log elements of the one or more training log records, and each of the one or more training log records including one or more log elements.

2. The method of claim 1, further comprising:
   providing the built tree structure for detecting a system fault.

3. The method of claim 1, wherein the tree structure represents a behavior considered as normal of a system.

4. The method of claim 1, wherein building the tree structure using the one or more training log records further comprises:
   for each of the one or more training log records, splitting the training log record into a list of successive log elements and associating the successive log elements in the list to successive tree nodes in the tree structure.

5. The method of claim 1, wherein building the tree structure using the one or more training log records further comprises:
   assigning a frequency value to at least certain ones of the tree nodes in the tree structure, the frequency value indicating how often the one or more training log records includes the log element associated with the tree node.

6. The method of claim 1, wherein the certain ones of the tree nodes include all the nodes of the tree structure.

7. A method implemented in a computing device for fault detection, the method comprising:
   obtaining, by the computing device, a live log record; and
   determining, by the computing device, an anomaly in the live log record by comparing successive elements of the live log record to corresponding successive nodes in a root-to-leaf direction of a tree structure, the tree structure including a plurality of tree nodes, each successive tree node in the root-to-leaf path of the tree structure representing successive log elements of one or more training log records, and each of the one or more training log records including at least one log element.

8. The method of claim 7, further comprising:
   comparing a first log element of the incoming live log record with a first node of the tree structure and finding a match therebetween;
   comparing a next second log element of the incoming live log record with one or more children nodes of the first node of the tree structure; and
   concluding to an anomaly if none of the children nodes matches the next second log element of the incoming live log record.

9. The method of claim 7, wherein determining the anomaly in the live log record by comparing the live log record to the tree structure further comprises:
   mapping the obtained live log record to a corresponding tree path of the tree structure; and
   determining at least one difference between tree node values of the corresponding tree path and corresponding log elements of the live log record.

10. The method of claim 7, wherein the tree structure represents a behavior considered as normal of a system.

11. The method of claim 7, wherein comparing the live log record to the tree structure further comprises:
    traversing a path along the tree structure, the path to traverse being determined by reading successive log elements in the live log record.

12. The method of claim 11, wherein each of the read successive log elements in the live log record determines which next tree node to traverse along the tree structure.

13. The method of claim 7, wherein determining the anomaly in the live log record further comprises:
    identifying the live log record is an anomaly when one of the live log record elements either does not match any tree node in the tree structure or matches a tree node of the tree structure that has a frequency below a certain threshold, wherein said frequency represents a number of times the tree node value has been recorded in training records.

14. The method of claim 7, further comprising:
    if the live log record is determined to be an anomaly, initiating determining whether the anomaly is a fault.

15. The method of claim 14, further comprising:
    if the anomaly is determined not to be a fault, causing the tree structure to be updated with the live log record.

16. The method of claim 14, wherein initiating determining whether the anomaly is a fault further comprises:
    initiating determining whether the anomaly was previously detected; and
    if the anomaly was previously determined to be a fault, reporting the fault;
    otherwise, initiating a test to determine if the anomaly is a fault.

17. A computing device for building a tree structure to represent a system behavior, the computing device comprising processing circuitry, the processing circuitry configured to cause the computing device to:
    obtain one or more training log records; and
    build a tree structure using the one or more training log records, the tree structure including a plurality of tree nodes, each successive tree node in a root-to-leaf path of the tree structure representing successive log elements of the one or more training log records, and each of the one or more training log records including one or more log elements.

18. The computing device of claim 17, wherein the processing circuitry is further configured to cause the computing device to:
    provide the built tree structure for detecting a system fault.

19. The computing device of claim 17, wherein the tree structure represents a behavior considered as normal of a system.

20. The computing device of claim 17, wherein the processing circuitry is further configured to cause the computing device to build the tree structure using the one or more training log records by being configured to cause the computing device to:

for each of the one or more training log records, split the training log record into a list of successive log elements and associating the successive log elements in the list to successive tree nodes in the tree structure.

21. The computing device of claim 17, wherein the processing circuitry is further configured to cause the computing device to build the tree structure using the one or more training log records by being configured to cause the computing device to:

assign a frequency value to at least certain ones of the tree nodes in the tree structure, the frequency value indicating how often the one or more training log records includes the log element associated with the tree node.

22. The computing device of claim 17, wherein the certain ones of the tree nodes include all the nodes of the tree structure.

23. A computing device for fault detection, the computing device comprising processing circuitry, the processing circuitry configured to cause the computing device to:

obtain a live log record; and
determine an anomaly in the live log record by comparing successive elements of the live log record to corresponding successive nodes in a root-to-leaf direction of a tree structure, the tree structure including a plurality of tree nodes, each successive tree node in the root-to-leaf path of the tree structure representing successive log elements of one or more training log records, and each of the one or more training log records including at least one log element.

24. The computing device of claim 23, wherein the processing circuitry is further configured to cause the computing device to:

compare a first log element of the incoming live log record with a first node of the tree structure and finding a match therebetween;
compare a next second log element of the incoming live log record with one or more children nodes of the first node of the tree structure; and
conclude to an anomaly if none of the children nodes matches the next second log element of the incoming live log record.

25. The computing device of claim 23, wherein the processing circuitry is further configured to cause the computing device to determine the anomaly in the live log record by comparing the live log record to the tree structure by being configured to cause the computing device to:

map the obtained live log record to a corresponding tree path of the tree structure; and determine at least one difference between tree node values of the corresponding tree path and corresponding log elements of the live log record.

26. The computing device of claim 23, wherein the tree structure represents a behavior considered as normal of a system.

27. The computing device of claim 23, wherein the processing circuitry is further configured to cause the computing device to compare the live log record to the tree structure by being configured to cause the computing device to:

traverse a path along the tree structure, the path to traverse being determined by reading successive log elements in the live log record.

28. The computing device of claim 27, wherein each of the read successive log elements in the live log record determines which next tree node to traverse along the tree structure.

29. The computing device of claim 23, wherein the processing circuitry is further configured to cause the computing device to determine the anomaly in the live log record by being configured to cause the computing device to:

identify the live log record as an anomaly when one of the live log record elements either does not match any tree node in the tree structure or matches a tree node of the tree structure that has a frequency below a certain threshold, wherein said frequency represents a number of times the tree node value has been recorded in training records.

30. The computing device of claim 23, wherein the processing circuitry is further configured to cause the computing device to:

if the live log record is determined to be an anomaly, initiate determining whether the anomaly is a fault.

31. The computing device of claim 30, wherein the processing circuitry is further configured to cause the computing device to:

if the anomaly is determined not to be a fault, cause the tree structure to be updated with the live log record.

32. The computing device of claim 30, wherein the processing circuitry is further configured to cause the computing device to initiate determining whether the anomaly is a fault by being configured to cause the computing device to:

initiate determining whether the anomaly was previously detected; and
if the anomaly was previously determined to be a fault, reporting the fault;
otherwise, initiating a test to determine if the anomaly is a fault.

* * * * *